Feb. 17, 1959 S. R. PARKER 2,874,234

HIGH GAIN SIGNAL AMPLIFIER CIRCUIT

Filed Jan. 31, 1955

INVENTOR.
SYDNEY R. PARKER

BY H. L. Newton

ATTORNEY 2,874,234
Patented Feb. 17, 1959

2,874,234

HIGH GAIN SIGNAL AMPLIFIER CIRCUIT

Sydney R. Parker, Pitman, N. J., assignor, by mesne assignments, to the United States of America as represented by the Secretary of the Navy Application January 31, 1955, Serial No. 485,171

1 Claim. (Cl. 179—171)

This invention relates to signal amplifier circuits and more particularly to a high gain electron tube signal amplifier circuit.

In order to secure the maximum amplification of an electron tube amplifier the signal impedance of the output circuit should, theoretically, be infinite, while the direct current impedance of the output circuit should be such as to maintain the quiescent operating point of the tube where the tube has the highest transconductance. The ordinary electron tube amplifier circuit has a signal load impedance whose value is determined by a compromise between a very high output impedance to secure high gain operation, and a relatively low output impedance to secure the optimum quiescent operating point. It may therefore be desirable to operate an electron tube amplifier tube into a signal load impedance that is as high as possible while at the same time maintaining a normal quiescent operating point.

Accordingly, it is one of the objects of the present invention to provide an improved electron tube signal amplifier circuit having a large signal impedance resulting in a high signal gain while at the same time having normal operating characteristics.

It is another object of the present invention to provide an electron tube amplifier having a relatively high signal load impedance while at the same time providing a relatively low D.-C. load impedance and resultant operation under normal quiescent conditions.

It is yet another object of the present invention to provide an electron tube amplifier having a signal output circuit for maintaining essentially constant current through the tube under all signal conditions.

These and further objects and advantages of the present invention are achieved, in general, by providing an extremely high signal load impedance for an electron tube amplifier by connecting the anode of an amplifier tube to a load impedance and by providing a pair of cathode follower amplifiers to connect a signal voltage change at the high signal voltage end of the load impedance to the other end of the impedance. The output voltage of the first cathode follower is the amplifier output voltage, and this voltage also provides the signal for the second cathode follower. If the gains of the two cathode followers were unity, a constant current would flow through the plate load impedance of the electron tube amplifier and it would thus be seen an infinite dynamic or signal load impedance, and, as the gains of the cathode followers are nearly unity, the dynamic impedance present to the tube is very high, while the D.-C. loal impedance is kept relatively low.

Figure 1:
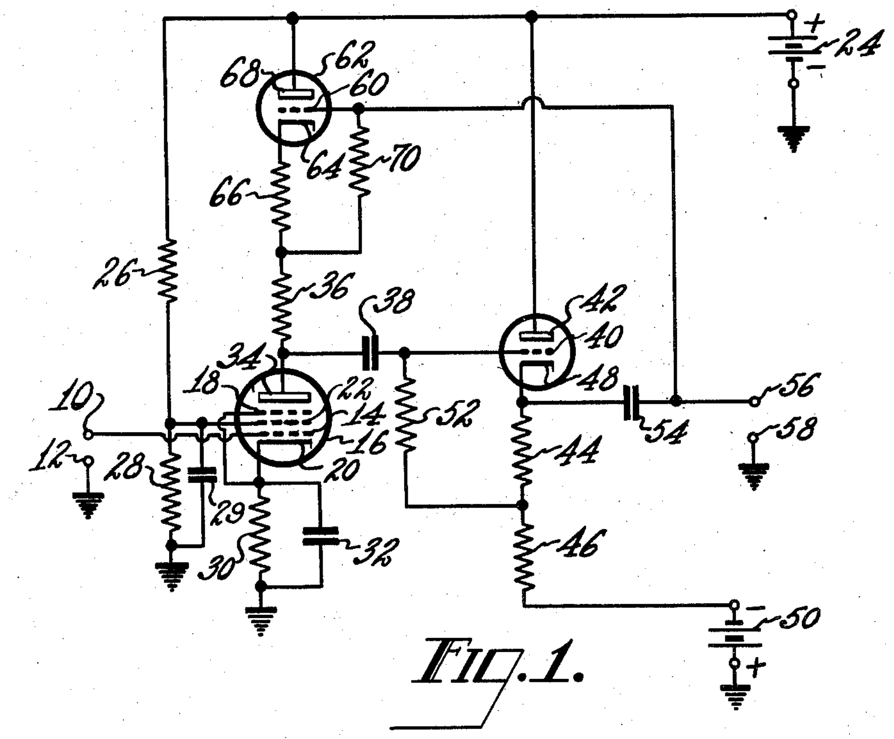
Figure 2:
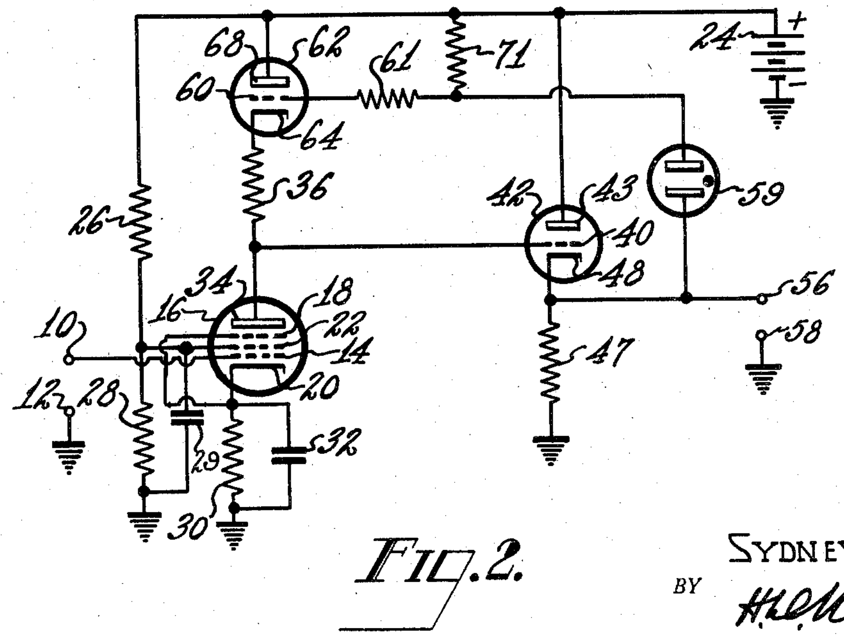

However, the invention, both as to its organization and operation, will be best understood when the following description is read in connection with the accompanying drawing; in which, Figure 1 is a schematic diagram of an electron tube signal amplifier circuit embodying the present invention; and Figure 2 is a schematic diagram of an electron tube signal amplifier circuit illustrating a further embodiment of the present invention.

Referring now to the drawings and particularly to Figure 1, an A.-C. coupled signal amplifier, here shown as a pentode amplifier, includes a pair of input terminals 10 and 12, terminal 12 being connected to ground for the amplifier and terminal 10 being connected directly to the grid 14 of a pentode amplifier tube 16. The suppressor grid 18 of the tube 16 is connected directly to the cathode 20, and the screen electrode 22 is supplied with operating potential from the junction of a voltage divider consisting of a pair of resistors 26 and 28 connected between ground and a source of voltage 24 positive with respect to ground. The usual screen bypass capacitor 29 is connected between the screen 22 and ground. The cathode 20 is connected to ground through a bias resistor 30. A signal bypass capacitor 22 is shunted across the bias resistor 30.

A signal applied to the grid 14 through the terminal 10 is amplified through the tube 16 and appears at the anode 34. The amplified signal is then coupled from the junction of a load resistor 36 and the anode 34 through a capacitor 38 to the grid 40 of a first cathode follower triode 42. The load resistance for the first cathode follower triode 42 consists of a pair of load resistors 44 and 46 connected between the cathode 48 and a second source of operating voltage 50 negative with respect to ground. The grid 40 is biased by a resistor 52 connected between the grid 40 and the junction between the load resistors 46 and 44. The anode 43 is connected directly to the source of positive operating voltage 24. The signal from the cathode 44 of the first cathode follower amplifier is coupled through a second coupling capacitor 54 to a signal output terminal 56 and the output voltage appears between this terminal 56 and a ground terminal 58.

The second coupling capacitor 54 also couples the signal to the grid 60 of a second cathode follower amplifier tube 62 that has its cathode 64 connected through a bias resistor 66 in series to the load resistor 36 of the pentode amplifier tube 16. The anode 68 of the second cathode follower 62 is connected to the source of positive operating potential 24, and the grid 60 of the second cathode follower 62 is biased by a resistor 70 connected from the junction of the pentode load resistor 36 and the bias resistor 66 to the grid 60.

The circuit operates in the following manner: as the anode 34 of the pentode 16 rises, substantially the same rise is coupled through the first cathode follower 42 to the output terminal 56 since the gain of the cathode follower is near unity. The voltage rise is also coupled to the grid 60 of the second cathode follower 62 and thus appears as substantially the same rise at the cathode 64 of the second cathode follower 62 which is connected to the end of the load resistor 36 opposite that from which the voltage rise began. Thus, both ends of the load resistor 36 are raised in voltage by nearly equal amounts, and the current through the load resistor 36, and, hence, the pentode 16, remains substantially constant, presenting a very large dynamic impedance to the signal voltage.

The D.-C. load circuit of the pentode 16, however, consists merely of the space current path of the second cathode follower amplifier 62 in series with the bias resistor 66 and pentode load resistor 36. This bias resistor 66 and the tube 62 have a relatively small D.-C. resistance compared to the load resistor 36 and, thus, the load resistor 36, the bias resistor 66 and the triode tube 62 can be chosen to secure the optimum operating point for the tube 16, while at the same time presenting an extremely high output impedance to the signal.

As an example, a practical pentode amplifier circuit embodying the present invention was constructed using the schematic diagram of Figure 1 and components having the following values:

| | | |
|---|---|---|
| Resistor: | | |
| 26 | ohms | 47,000 |
| 28 | do | 10,000 |
| 30 | do | 470 |
| 36 | do | 33,000 |
| 44 | do | 2,700 |
| 46 | do | 150,000 |
| 52 | do | 1,000,000 |
| Capacitor: | | |
| 29 | microfarads | .1 |
| 32 | do | 25 |
| 38 | do | .1 |
| 54 | do | .1 |

The pentode 16 was a commercial type 6AU6 and the triodes 42 and 62 were each ½ of a commercial type 12AX7 dual-triode tube. With the values of components given and the tubes described, gains of approximately 2,000 were measured for this stage.

Referring now to Figure 2 a direct-coupled pentode signal amplifier circuit embodying the present invention again includes input terminals 10 and 12, with terminal 12 being connected to ground and terminal 10 connected to the grid 14 of the amplifier tube 16. The suppressor grid 18 is again connected to the cathode 20 and bias voltage is provided by connecting a resistor 30 between the cathode 20 and ground for the system. A capacitor 32 again bypasses the resistor 30 for signal frequencies, and the screen grid 22 is again biased by being connected to the junction of two voltage divider resistors 26 and 28, connected across a source of operating voltage 24 positive with respect to ground, and a screen 22 is bypassed to ground at signal frequencies by a capacitor 29.

A signal is amplified, as before, through the tube 16 and appears at the anode 34 where it is then coupled directly to the grid 40 of a first cathode follower tube 42 and simultaneously to the load resistor 36 in series with the space current path of a second cathode follower amplifier tube 64. The anode 43 of the first cathode follower 42 is again connected directly to the positive source of operating voltage 24 and the cathode 48 is connected to ground through a load resistor 47. The cathode 48 is directly connected to a terminal 56 and the output signal again appears between terminal 56 and a ground terminal 58.

The output signal is also connected through a neon glow discharge tube 59 and a resistor 61 to the grid 60 of the second cathode follower amplifier tube 62. The cathode 64 of this tube 62 is connected directly with the load resistor 36 and the anode 68 is connected directly to the source of operating voltage 24. Bias voltage is supplied to the grid 60 through a resistor 71 connected between the source of operating voltage 24 and the junction of the resistor 61 and the neon tube 59. The neon tube 59 has sufficient D.-C. voltage appearing across it when lit to secure the proper bias, but has little or no signal impedance.

It is readily apparent that the direct-coupled circuit operates in a manner identical to the circuit of Figure 1, that is, a rise in voltage of the anode 34 of the pentode 16 is coupled to the first cathode follower amplifier tube 42 and then through the second cathode follower amplifier tube 62 to its cathode in a manner similar to the circuit of Figure 1. Thus, if the gains of the cathode followers 42 and 62 were exactly unity both ends of the load resistor would be raised identical amounts and an infinite dynamic impedance would be presented to the pentode output signal. Since the gains of the cathode followers are nearly unity a high signal impedance is presented in the output circuit of the tube.

As a further example, a practical circuit, again using as a commercial type 6AU6 pentode tube 16 and a commercial type 12AX7 dual-triode tube as the triodes 42 and 62, was constructed with the following values for the components:

| | | |
|---|---|---|
| Resistor: | | |
| 28 | ohms | 10,000 |
| 30 | do | 470 |
| 36 | do | 68,000 |
| 47 | do | 100,000 |
| 61 | do | 330,000 |
| 71 | do | 820,000 |
| Capacitor: | | |
| 29 | microfarads | .1 |
| 32 | do | 25 |
| Neon tube 59 | | Type NE2 |

The gain of the amplifier as constructed above was measured in the vicinity of 2,000.

An improved electron tube signal amplifier circuit as provided in accordance with the invention has extremely high gain because of a very high dynamic or signal load impedance, and yet operates at an optimum D.-C. quiescent condition because the correct value of D.-C. load impedance can be selected to secure the highest transconductance available from the tube. Thus it has extensive application in any amplifier where high signal gain is desired.

What is claimed is:

In a signal amplifier circuit including a pentode amplifier tube having a control grid, an anode, and a cathode, the combination comprising, means for applying an input signal to said control grid, a biasing impedance connecting said cathode to ground having bypass means thereacross for grounding said cathode for alternating currents, a load impedance for said pentode amplifier tube having one end thereof connected to the anode of said pentode amplifier tube, a second tube having an anode, a cathode, and a control electrode with the cathode thereof connected to the other end of said load impedance, a cathode follower circuit having an input which is connected to the plate of said pentode amplifier tube, the output of said cathode follower being coupled to the control electrode of said second tube, means for connecting a potential across said second and said pentode tubes, and an output terminal means for driving a load connected to the output of said cathode follower circuit, whereby a high output impedance is seen by said pentode amplifier tube, said cathode follower providing the impedance stepdown for driving the output terminal and said second tube, said second tube inserting output signals in effective series relation with said pentode amplifier tube.

References Cited in the file of this patent

UNITED STATES PATENTS

| | | |
|---|---|---|
| 2,326,614 | Bowman | Aug. 10, 1943 |
| 2,658,117 | Sunstein et al. | Nov. 3, 1953 |
| 2,689,886 | Cooper et al. | Sept. 21, 1954 |